(12) United States Patent
Hsieh

(10) Patent No.: US 7,386,224 B2
(45) Date of Patent: Jun. 10, 2008

(54) DC BRUSHLESS FAN MOTOR DRIVING CIRCUIT

(75) Inventor: Hsin-Mao Hsieh, Ping Tung (TW)

(73) Assignee: Adda Corp., Ping Tung (TW)

( * ) Notice: Subject to any disclaimer, the term of this patent is extended or adjusted under 35 U.S.C. 154(b) by 468 days.

(21) Appl. No.: 11/208,600

(22) Filed: Aug. 23, 2005

(65) Prior Publication Data

US 2007/0047929 A1    Mar. 1, 2007

(51) Int. Cl.
*H02P 7/29* (2006.01)
(52) U.S. Cl. .................................. 388/829; 388/830
(58) Field of Classification Search ............ 388/829
See application file for complete search history.

(56) References Cited

U.S. PATENT DOCUMENTS 7,138,776 B1 * 11/2006 Gauthier et al. ....... 318/400.34

7,276,877 B2 * 10/2007 Qiu et al. ................... 318/721

\* cited by examiner

*Primary Examiner*—Lincoln Donovan
*Assistant Examiner*—Michael Brandt
(74) *Attorney, Agent, or Firm*—Bacon & Thomas, PLLC

(57) ABSTRACT

A DC brushless fan motor driving circuit has a Hall PWM signal generator, a speed signal generator, a PWM driver and a full-bridge switching circuit. The Hall PWM signal generator obtains a Hall sine wave signal from an external Hall sensor and converts the Hall sine wave signal to a varied Hall PWM signal. The speed signal generator is connected to an external PWM input signal to set speed of a fan motor and a low speed voltage to determine a present speed setting signal. The speed signal generator further obtains the varied Hall PWM signal to compare the present speed setting signal to generate a SPWM signal to the PWM driver. The PWM driver outputs a SPWM signal to the full-bridge switching circuit and then coil current is formed close to a sine wave signal to decrease the electromagnetic noise.

11 Claims, 6 Drawing Sheets

Duty 20%

Duty 50%

Duty 80%

US 7,386,224 B2

DC BRUSHLESS FAN MOTOR DRIVING CIRCUIT

BACKGROUND OF THE INVENTION

1. Field of the Invention

The present invention relates to a driving circuit for a DC brushless fan motor, and more particularly to a DC brushless fan motor driving circuit having low electromagnetic noise.

2. Description of Related Art

Two types of driving circuit exist to drive a DC brushless fan motor that has a single coil (52). One type is a single-phase full-wave motor driving circuit, and the other one type is a two-phase half-wave motor driving circuit. Each motor driving circuit uses a driver element to drive the fan motor, and the output driving signal of the driver is a form of pulse width modulation (PWM).

With reference to FIG. 4, one DC brushless fan motor driving circuit has a PWM driver (50), a Smith trigger (53), a Hall sensor (not shown), a lock detecting and auto-re-start circuit unit (54), an oscillator (501) and a full-bridge switching circuit unit (51).

The PWM driver (50) has a Hall signal input terminal (I1), a PWM input terminal (I4), a low speed setting terminal (I5), a frequency output terminal (FG O/P), a reset terminal (I3), a clock input terminal (I2) connected to the oscillator (501) and multiple controlling output terminals (O1~O4). Each controlling output terminal (O1~O4) outputs a controlling signal, that is a form of a PWM wave signal. The low speed setting terminal (I5) is connected to an external low speed setting signal (Low Speed Set). The PWM input terminal (I4) is connected to an external PWM input signal (PWM I/P). The external PWM input signal (PWM I/P) adjusts the speed of the fan motor by changing the width of the PWM input signal.

The Hall sensor is connected to the hall signal input terminal (I1) of the PWM driver (50) through the Smith trigger (53). The Smith trigger (53) converts the Hall sine wave signal output from the Hall sensor to a square wave signal.

The lock detecting and auto-re-start circuit (54) has two inputs and one output. The two inputs are respectively connected to the Smith trigger (53) and the oscillator (501), and the output is connected to the reset terminal (I3) of the PWM driver (50).

The full-bridge switching circuit (51) can have four electronic switches (not shown), each of which has a controlling terminal. The four controlling terminals are connected respectively to the output terminals (O1~O4) of the PWM driver (50) and the coil (52) of the fan motor. The PWM driver (50) controls the conductive sequence of the full-bridge switching circuit (51) and the conductive period of each electronic switch to adjust coil current amplitude and a coil current direction in the coil (52) of the fan motor.

The PWM driver (50) compares the PWM input signal (PWM I/P) and the low speed setting signal (Low Speed Set) to determine whether the PWM input signal (PWM I/P) is larger than the low speed setting terminal (Low Speed Set). If the PWM input signal (PWM I/P) is larger than the low speed setting signal, the PWM driver (50) will drive the fan motor at a higher speed through the full bridge switching circuit (51). If not, the PWM driver (50) will keep the fan motor at a low speed condition.

With further reference to FIGS. 5A to 5C, three different controlling signals (COT1~COT3) are input to one controlling terminal (O1) of the full bridge switching circuit (51) to produce three coil currents ($I_{L1}$~$I_{L3}$). Since the controlling signal is formed of the PWM wave signal, the first to third controlling signal (COT1~COT3) are different pulse widths respectively with 20%, 50% and 80% duty cycles. When the fan motor is driven by the third controlling signal (COT3) having an 80% duty cycle, the speed of the fan motor is faster than the fan motor driven by the first or second controlling signals (COT1, COT2). However, each coil current ($I_{L1}$~$I_{L3}$) has a serious ripper phenomenon and the rate of change of the coil current is large. Therefore, the fan motor driven by the forgoing controlling signals will be electromagnetically noisy. In addition, the reliability of the motor driving circuit will be reduced.

With reference to FIG. 6A, forming the controlling signal from a PWM wave signal is easy, but electromagnetic noise is not reduced or eliminated. Since the controlling signal is formed from a PWM wave signal similar to a square wave signal, the rate of change of the coil current is large, and the ripper phenomenon is obvious.

To overcome the forgoing drawback, one solution is proposed. With reference to FIG. 6B, forming the controlling signal as a trapezoidal wave signal makes the rate of change of the coil current smaller than that of the coil current driven by the PWM wave signal. Thus, the electromagnetic noise will be slightly reduced. Although the trapezoidal wave signal slightly reduces the electromagnetic noise, the frequency of the trapezoidal wave signal is limited in a specific range. Therefore, to achieve the same high speed of the fan motor, a motor driving circuit that is implemented to output the trapezoidal wave signal requires a larger current than that of the PWM driving circuit. For example, to drive the fan motor to work at 4000 rpm, the motor driving circuit with the PWM controlling signal requires a coil current of about 300 mA, and the motor driving circuit with the trapezoidal wave signal requires about 350 mA. Therefore, the motor driving circuit with the trapezoidal wave signal has higher power consumption.

Therefore, the present invention provides a DC brushless fan motor driving circuit to reduce the electromagnetic noise and consume less power.

SUMMARY OF THE INVENTION

The main objective of the present invention is to provide a DC brushless fan motor driving circuit that reduces the electromagnetic noise when the DC fan motor is driven.

A DC brushless fan motor driving circuit has a Hall PWM signal generator, a speed signal generator, a PWM driver and a full-bridge switching circuit. The Hall PWM signal generator obtains a Hall sine wave signal from an external Hall sensor and converts the Hall sine wave signal to a varied Hall PWM signal. The speed signal generator is connected to an external PWM input signal to set speed of a fan motor and a low speed voltage to determine a present speed setting signal. The speed signal generator further obtains the varied Hall PWM signal to compare the present speed setting signal to generate a SPWM signal that is sent to the PWM driver. The PWM driver outputs a SPWM signal to a full-bridge switching circuit, and then coil current is formed close to a sine wave signal to decrease the electromagnetic noise.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
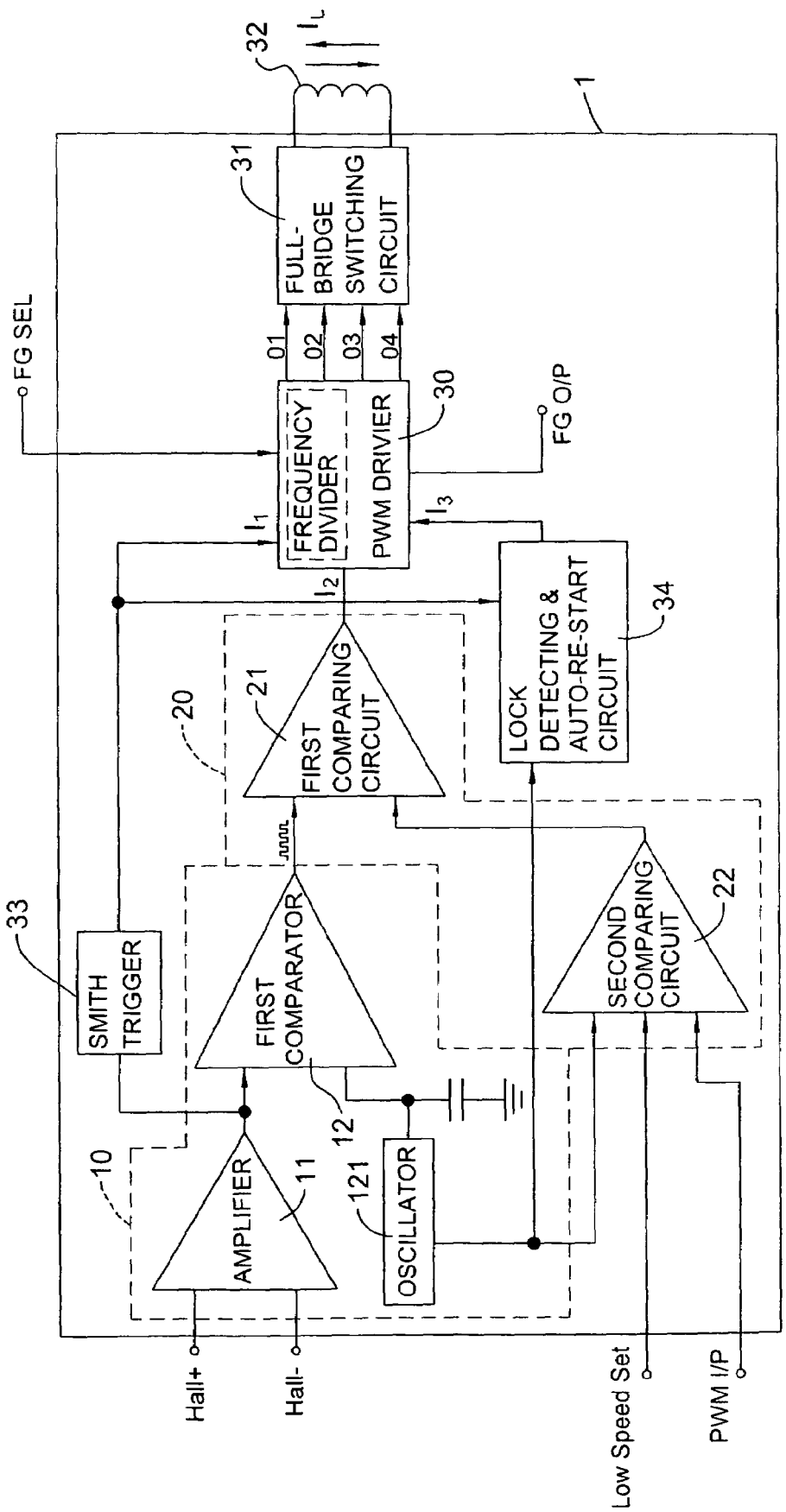
FIG. 1 is a functional block diagram of a DC brushless fan motor driving circuit in accordance with the present invention.

With reference to FIG. 1, a driving circuit in accordance with the present invention for DC brushless fan motor with a single coil (32) has a Hall pulse width modulation (PWM) signal generator (10), a speed signal generator (20), a PWM driver (30) and a full bridge switching circuit unit (31), which can be integrated into one integrated circuit (IC) element (1).

The Hall PWM signal generator (10) has an amplifier (11), a first comparator (12) and an oscillator (121). The amplifier (11) is connected to an external Hall sensor (not shown) that outputs a Hall sine wave signal and amplifies the Hall sine wave signal. The first comparator (12) has two inputs and one output. One input is connected to the amplifier (11), and the other one is connected to the oscillator (121) that outputs an oscillating signal. Therefore, with further reference to FIG. 3A, the first comparator (12) compares the Hall sine wave signal ($S_H$) through the amplifier (11) to the oscillating signal (OSC) from the oscillator (121). The first comparator (12) outputs a Hall pulse width modulation (PWM) signal with a pulse width that is varied based on amplitudes of the Hall sine wave signal.

Figure 2:
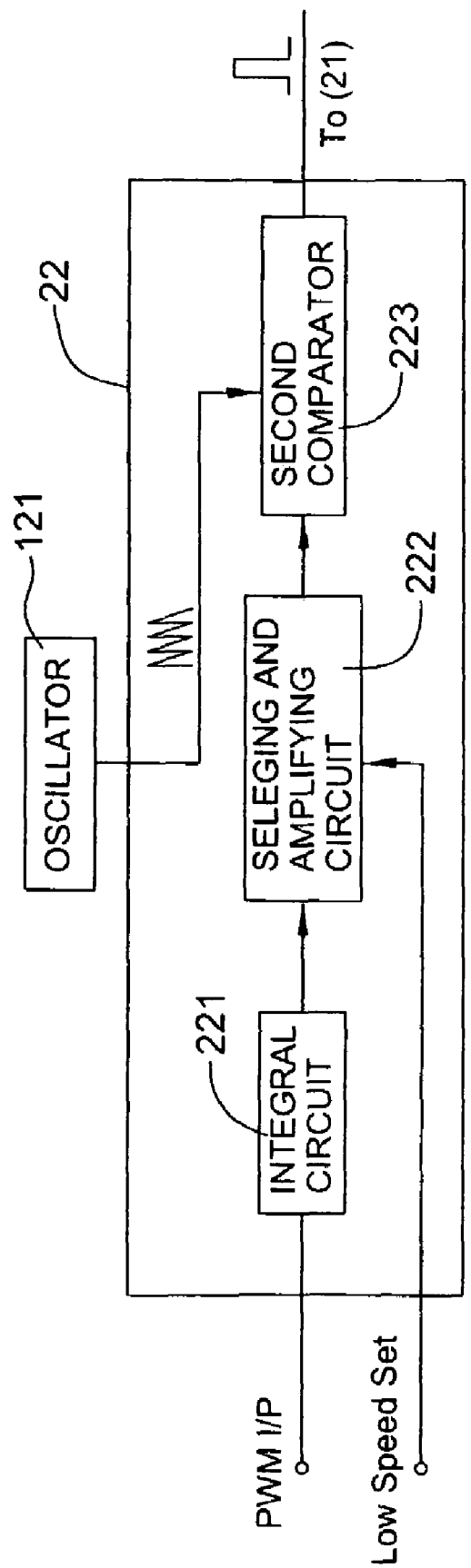
FIG. 2 is a detailed functional block diagram of a third comparator in accordance with the present invention.

The speed signal generator (20) has a first comparing circuit (21) and a second comparing circuit (22). The first comparing circuit (21) has two inputs and one output. One input of the speed signal generator (20) is connected to the output of the first comparator (12) in the Hall PWM signal generator (10). The first comparing circuit (21) can be a NAND logic circuit. With further reference to FIG. 2, the second comparing circuit (22) has an integral circuit (221), a selecting and amplifying circuit (222) and a second comparator (223). The integral circuit (221) has an input and an output. The input of the integral circuit (221) is connected to an external PWM input signal (PWM I/P), and the output is connected to the selecting and amplifying circuit (222). The integral circuit (221) converts the external PWM input signal to a corresponding DC voltage and then outputs the corresponding DC voltage to the selecting and amplifying circuit (222). The selecting and amplifying circuit (222) is further connected to a low speed setting signal (Low Speed Set). Usually, the low speed setting signal is a voltage. Therefore, the selecting and amplifying circuit (222) determines whether the DC voltage is higher than the external voltage. If so, the DC voltage will be amplified and then output to the second comparator (223). If not, the external voltage will be amplified and then output to the second comparator (223).

The second comparator (223) is further connected to the oscillator (121) to covert the DC voltage or external voltage to a PWM wave signal, and the PWM wave signal is a speed setting signal. The speed setting signal will be output to the other input of the first comparing circuit (21). Therefore, the first comparing circuit (21) obtains the speed setting signal and the Hall PWM signal to output a sinusoidal pulse width modulation (SPWM) signal to the PWM driver (30).

The PWM driver (30) has a frequency divider (301), a Hall signal input terminal (I1), a SPWM signal input terminal (I2), a reset terminal (I3), a frequency generating output terminal (FG O/P), four controlling output terminals (O1~O4) and an optional frequency divider setting terminal (FG SEL). The frequency divider (301) is built inside of the PWM driver (30). The Hall signal input terminal (I1) is connected to the amplifier (11) of the Hall PWM signal generator (10) through a Smith trigger (33). The SPWM signal input terminal (I2) is connected to the output of the first comparing circuit (21) to obtain a SPWM signal. The reset terminal (I3) is connected to a lock detecting and auto-re-start circuit (34). The frequency divider setting terminal (FG SEL) is connected to the frequency divider (301) and can be connected to different voltages to determine a divisor of the frequency divider (301).

The full-bridge switching circuit (31) has multiple controlling terminals connected respectively to corresponding controlling output terminals (O1-O4) of the PWM driver (30) and to the single coil (32) of the fan motor.

Figure 3:
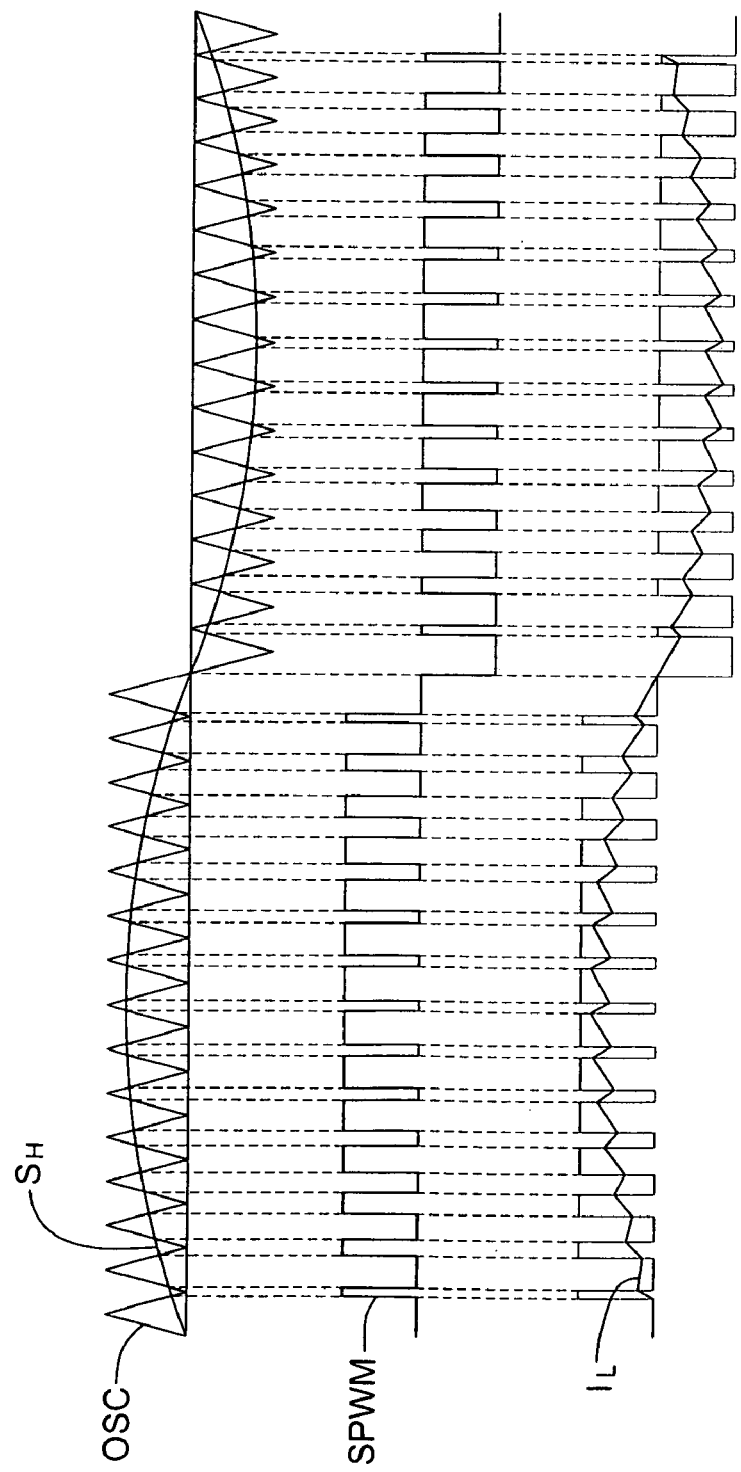
FIG. 3A is a combination of a Hall signal and an oscillating signal from an oscillator in accordance with the present invention.
FIG. 3B is a wave diagram of a PWM signal in accordance with the present invention.
FIG. 3C is a wave diagram of a SPWM signal in accordance with the present invention.
Figure 4:
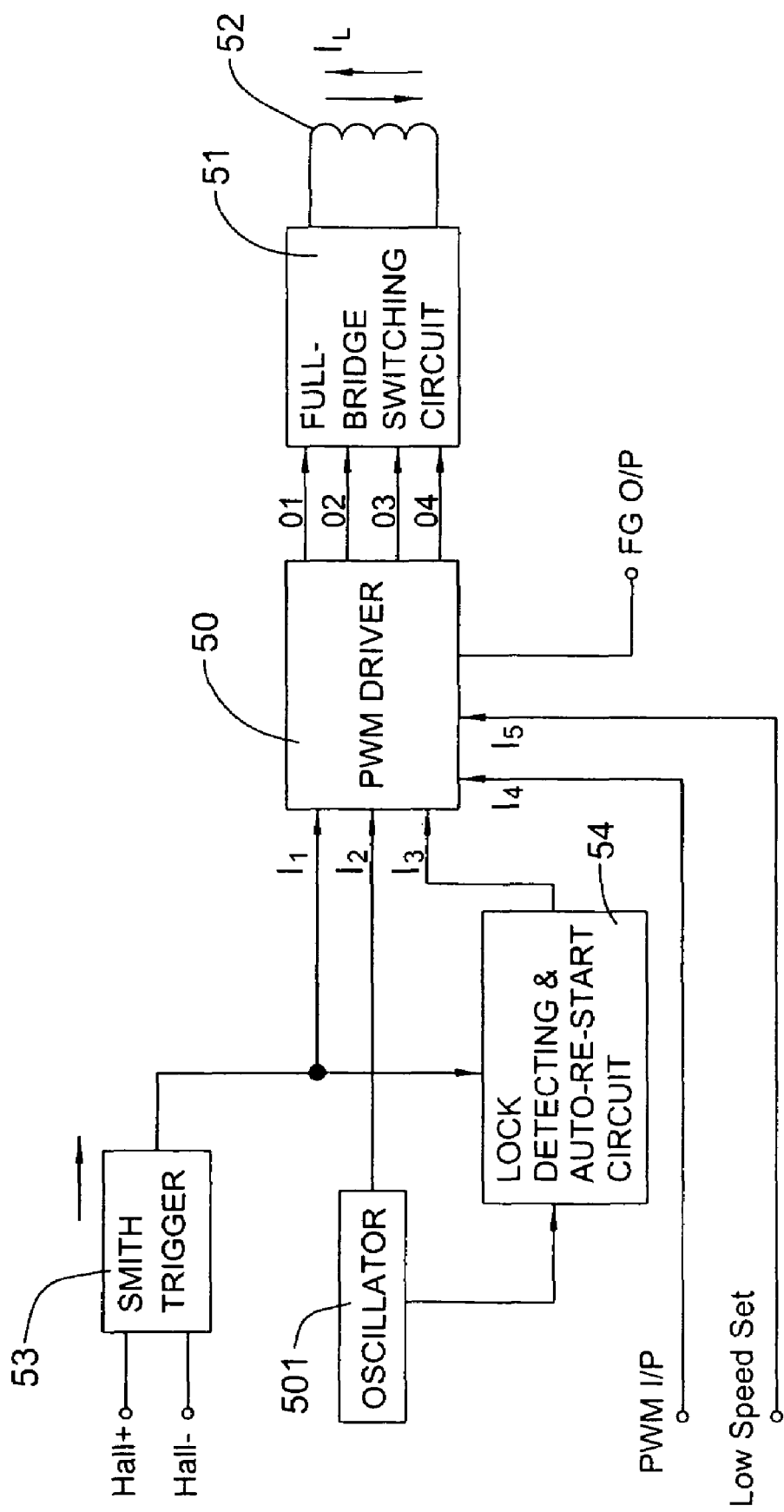
FIG. 4 is a functional block diagram of a conventional DC brushless fan motor driving circuit in accordance with the prior art.
Figure 5:
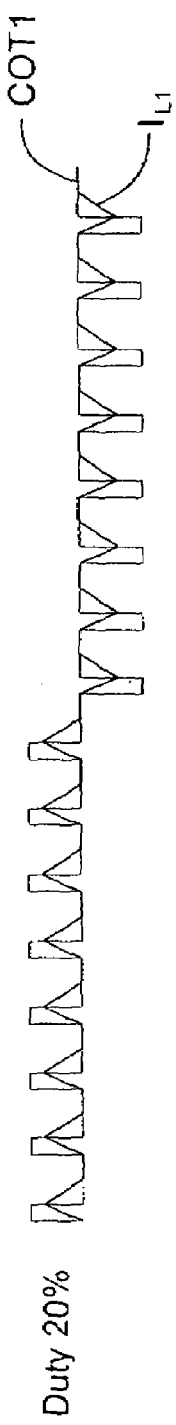
FIGS. 5A and 5C are coil current wave diagrams at different pulse widths of the PWM controlling signal in accordance with the present invention.
Figure 5:
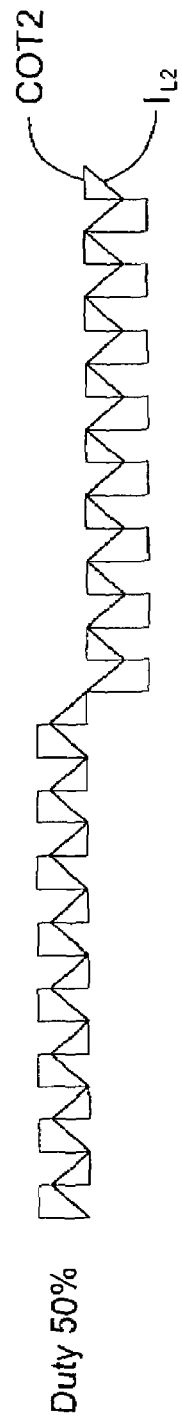
Figure 5:
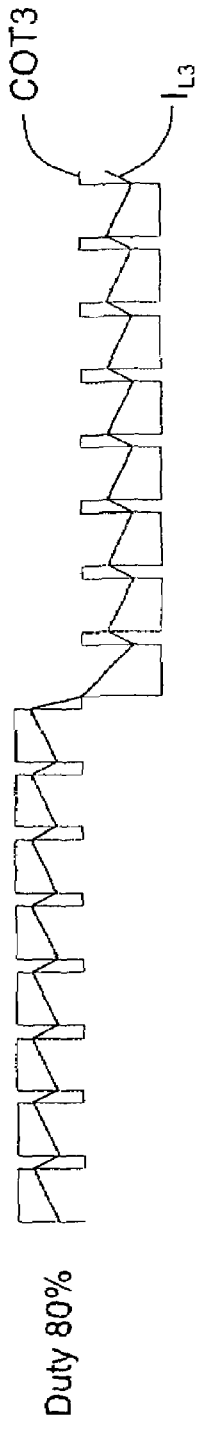
Figure 6:
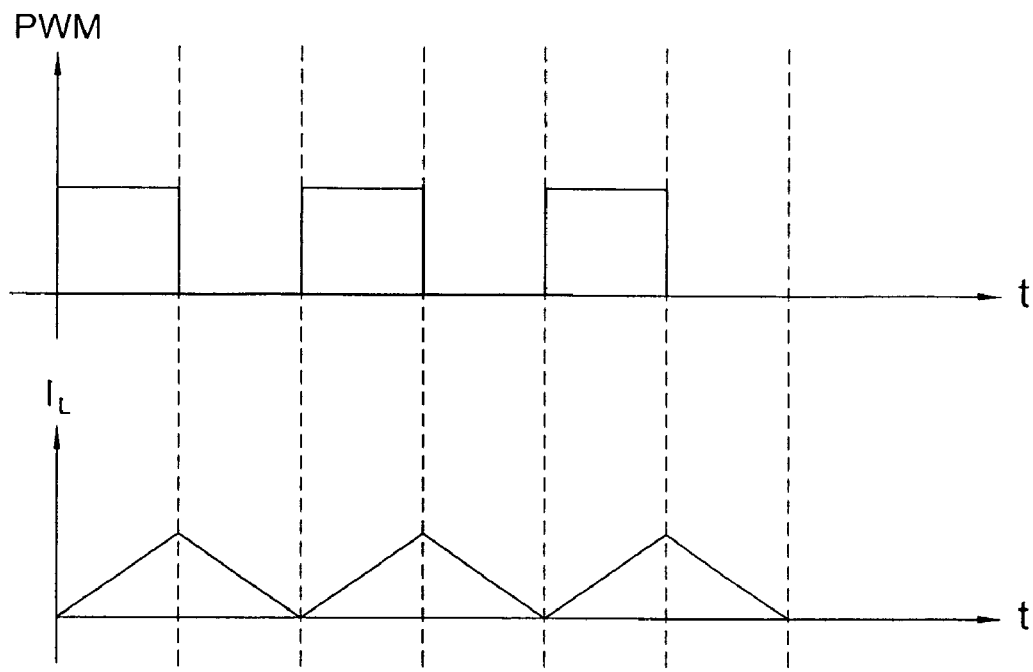
FIG. 6A is a wave diagram of a PWM controlling signal and a coil current in accordance with the prior art.
FIG. 6B is a wave diagram of a trapezoidal wave controlling signal and a coil current in accordance with another prior art.
Figure 6:
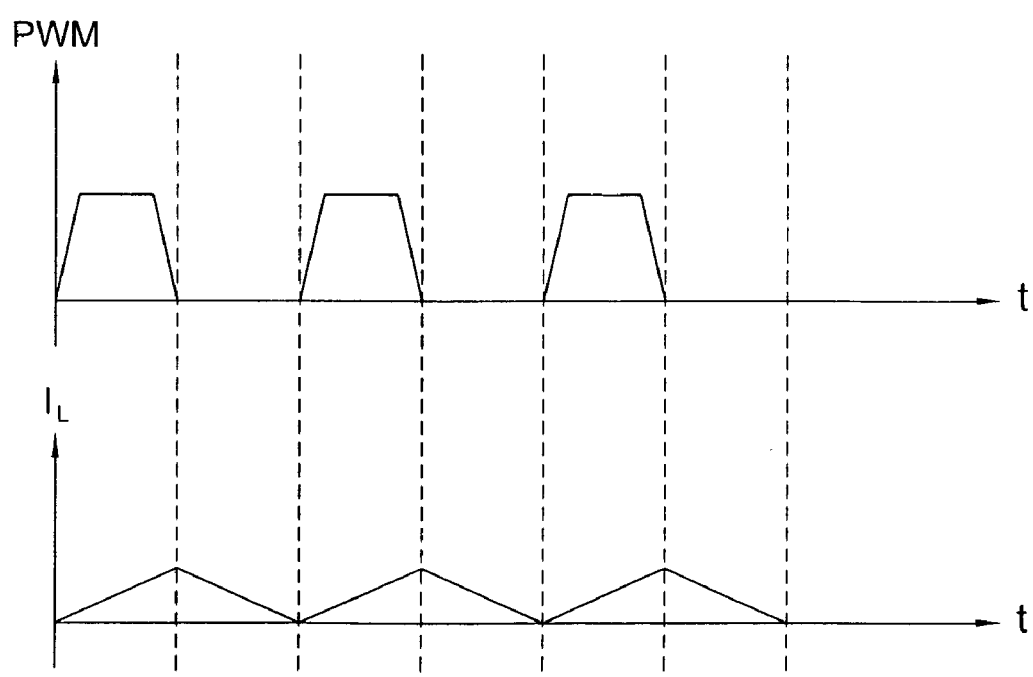

With reference to FIG. 3B, the PWM driver (30) outputs a SPWM controlling signal (SPWM) to one controlling terminal of the full-bridge switching circuit (31). With reference to FIG. 3C, when the fan motor is driven by the SPWM controlling signal, the coil current ($I_L$) is close to a sine wave. The ripper phenomenon of the coil current ($I_L$) is effectively reduced so the motor driving circuit in accordance with the present invention drives the fan motor with the single coil with less electromagnetic noise.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A DC brushless fan motor driving circuit, comprising:
    a Hall pulse width modulation (PWM) signal generator adapted to be connected to an external Hall sensor to convert a Hall sine wave signal to a Hall PWM signal with a pulse width, wherein the pulse width of the Hall PWM signal is varied based on amplitudes of the Hall sine wave signal;
    a speed signal generator connected to the Hall PWM signal generator to obtain the Hall PWM signal and an external PWM input signal and compares the external PWM input signal and the Hall PMW signal to generate a SPWM signal;

a PWM driver having
  a Hall signal input terminal,
  a SPWM signal input terminal connected to the speed signal generator to obtain the varied PWM signal to determine a speed of a fan motor,
  a reset terminal,
  a frequency generating output terminal and
  multiple controlling output terminals; and
a full-bridge switching circuit having multiple controlling terminals that are connected respectively to the multiple controlling signal output terminals of the PWM driver and adapted to connect to a single coil of the fan motor.

2. The driving circuit as claimed in claim 1, wherein the Hall PWM signal generator comprises:
  an amplifier adapted to be connected to an external Hall sensor to amplify the Hall sine wave signal from the external Hall sensor; and
  a first comparator having two inputs and one output, wherein one input is connected to the amplifier, and the output is connected to the speed signal generator; and
  an oscillator connected to the other input of the first comparator.

3. The driving circuit as claimed in claim 2, wherein the speed signal generator comprises:
  a first comparing circuit having two inputs and one output, wherein one input is connected to the output of the first comparator of the Hall PWM signal generator, and the output is connected to the SPWM signal input terminal of the PWM driver; and
  a second comparing circuit having
    an integral circuit having an input and an output, wherein the input of the integral circuit is connect to the external PWM input signal to convert the PWM input signal to a corresponding DC voltage;
    a selecting and amplifying circuit connected to the output of the integral circuit and an external voltage to set low speed (Low Speed Set), wherein the selecting and amplifying circuit determines whether the DC voltage is higher than the external voltage and then amplifies and outputs a higher voltage; and
    a second comparator connected to the selecting and amplifying circuit and the oscillator to obtain the higher voltage from the oscillating signal and connected to the other input of the first comparing circuit, wherein the second comparator compares the higher voltage and amplifying circuit to output a speed setting signal, that is formed from a PWM wave signal.

4. The driving circuit as claimed in claim 3, wherein the first comparing circuit is an NAND logic circuit.

5. The driving circuit as claimed in claim 2, further comprising
  a Smith trigger connected between the amplifier of the Hall PWM signal generator and the Hall signal input terminal; and
  a lock detecting and auto-re-start circuit connected to the reset terminal.

6. The driving circuit as claimed in claim 1, wherein the PWM driver further comprises:
  a frequency divider built inside of the PWM driver; and
  a frequency divider setting terminal connected to the frequency divider.

7. The driving circuit as claimed in claim 2, wherein the PWM driver further comprises:
  a frequency divider built inside of the PWM driver; and
  a frequency divider setting terminal connected to the frequency divider.

8. The driving circuit as claimed in claim 3, wherein the PWM driver further comprises:
  a frequency divider built inside of the PWM driver; and
  a frequency divider setting terminal connected to the frequency divider.

9. The driving circuit as claimed in claim 4, wherein the PWM driver further comprises:
  a frequency divider built inside of the PWM driver; and
  a frequency divider setting terminal connected to the frequency divider.

10. The driving circuit as claimed in claim 5, wherein the PWM driver further comprises:
  a frequency divider built inside of the PWM driver; and
  a frequency divider setting terminal connected to the frequency divider.

11. The driving circuit as claimed in claim 1, wherein the Hall PWM signal generator, the speed signal generator, the PWM driver and the full-bridge switching circuit are integrated into one integrated circuit (IC) element.

* * * * *